(12) United States Patent
Kobayashi et al.

(10) Patent No.: US 11,341,536 B2
(45) Date of Patent: May 24, 2022

(54) INFORMATION PROCESSING DEVICE, INFORMATION PROCESSING METHOD, AND NON-TRANSITORY STORAGE MEDIUM

(71) Applicants: TOYOTA JIDOSHA KABUSHIKI KAISHA, Toyota (JP); Hitachi Solutions, Ltd., Tokyo (JP)

(72) Inventors: Atsuko Kobayashi, Nagoya (JP); Yuichiro Ueda, Chiryu (JP); Akira Iijima, Nagoya (JP); Daisuke Tanabe, Nisshin (JP); Manabu Yamamoto, Toyota (JP); Hiroyuki Goto, Ichinomiya (JP)

(73) Assignees: TOYOTA JIDOSHA KABUSHIKI KAISHA, Toyota (JP); Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 16/778,740

(22) Filed: Jan. 31, 2020

(65) Prior Publication Data
US 2020/0258123 A1   Aug. 13, 2020

(30) Foreign Application Priority Data
Feb. 7, 2019   (JP) ............................. JP2019-020458

(51) Int. Cl.
 *G06Q 30/00* (2012.01)
 *G06Q 30/02* (2012.01)
(52) U.S. Cl.
 CPC ..... *G06Q 30/0265* (2013.01); *G06Q 30/0207* (2013.01); *G06Q 30/0259* (2013.01); *G06Q 30/0261* (2013.01); *G06Q 30/0266* (2013.01); *G06Q 30/0267* (2013.01)
(58) Field of Classification Search
 None
 See application file for complete search history.

(56) References Cited

U.S. PATENT DOCUMENTS

| 6,360,167 B1 * | 3/2002 | Millington | G01C 21/26 342/357.31 |
| 6,505,118 B2 * | 1/2003 | Chowanic | G01C 21/3484 340/906 |

(Continued)

FOREIGN PATENT DOCUMENTS

JP   2016-126654 A   7/2016

*Primary Examiner* — Luis A Brown
(74) *Attorney, Agent, or Firm* — Sughrue Mion, PLLC

(57) ABSTRACT

An information processing device includes a control unit configured to execute acquiring a crowding level of a destination store that is a destination of a vehicle in which a user rides, extracting a store with a crowding level lower than the crowding level of the destination store as a predetermined recommended store from among other stores that belong to the same genre as the destination store and that do not belong to the same affiliated group as the destination store when the crowding level of the destination store is higher than a predetermined threshold value, generating a proposal advertisement for proposing to change the destination of the vehicle from the destination store to the predetermined recommended store, and presenting the proposal advertisement to the user who rides in the vehicle via a mobile terminal that moves with the vehicle.

17 Claims, 5 Drawing Sheets

STORE INFORMATION TABLE

| GENRE ID | ADVERTISER ID | STORE NAME | STORE LOCATION | IN-STORE CROWDING | WAITING GROUP |
|---|---|---|---|---|---|
| S0001 | C001 | ○○○ | ... | FULL | 3 |
| | C002 | △△△ | ... | EMPTY | 0 |
| | C003 | □□□ | ... | FULL | 2 |
| | C004 | ××× | ... | FULL | 1 |

(56) References Cited

U.S. PATENT DOCUMENTS

| | | | |
|---|---|---|---|
| 6,526,335 B1* | 2/2003 | Treyz | H04W 4/029 701/1 |
| 6,738,711 B2* | 5/2004 | Ohmura | G08G 1/096775 701/451 |
| 7,020,623 B1* | 3/2006 | Tiley | G06Q 30/02 705/14.23 |
| 2002/0032035 A1* | 3/2002 | Teshima | G09F 21/04 455/456.3 |
| 2002/0198790 A1* | 12/2002 | Paulo | G06Q 30/0639 705/26.8 |
| 2004/0224703 A1* | 11/2004 | Takaki | H04W 4/02 455/457 |
| 2005/0192008 A1* | 9/2005 | Desai | G06F 21/604 455/435.2 |
| 2005/0216511 A1* | 9/2005 | Umezu | G01C 21/3682 |
| 2006/0286989 A1* | 12/2006 | Illion | G06Q 30/02 455/456.3 |
| 2007/0010942 A1* | 1/2007 | Bill | G01C 21/3617 701/424 |
| 2007/0271035 A1* | 11/2007 | Stoschek | G01C 21/3697 701/533 |
| 2009/0006194 A1* | 1/2009 | Sridharan | G06Q 30/0273 705/14.62 |
| 2011/0034147 A1* | 2/2011 | Issa | H04M 1/72457 455/410 |
| 2011/0087427 A1* | 4/2011 | Liu | G01C 21/3679 701/532 |
| 2011/0112892 A1* | 5/2011 | Tarantino | G07F 17/32 705/14.1 |
| 2011/0178811 A1* | 7/2011 | Sheridan | H04W 4/024 705/1.1 |
| 2014/0222568 A1* | 8/2014 | Weitzman | G06Q 30/0259 705/14.57 |
| 2015/0088562 A1* | 3/2015 | Woods | G06Q 50/12 705/5 |
| 2015/0199612 A1* | 7/2015 | Segall | G06N 5/04 706/52 |
| 2016/0117926 A1* | 4/2016 | Akavaram | B60W 40/09 340/932.2 |
| 2016/0189439 A1* | 6/2016 | Vetterick | G06Q 30/0261 701/29.4 |
| 2016/0210711 A1* | 7/2016 | Krupa | G16H 40/63 |
| 2017/0200213 A1* | 7/2017 | Huang | G06F 16/00 |
| 2017/0225677 A1* | 8/2017 | Yoshida | B60W 30/025 |
| 2018/0082315 A1* | 3/2018 | Smid | G06Q 30/0203 |
| 2018/0114262 A1* | 4/2018 | Sanjeevaiah Krishnaiah | G06Q 30/0631 |
| 2018/0253805 A1* | 9/2018 | Kelly | G06Q 20/322 |
| 2018/0330407 A1* | 11/2018 | Nagarajan | G06Q 50/01 |
| 2019/0257665 A1* | 8/2019 | Friedman | G05D 1/0276 |
| 2020/0258123 A1* | 8/2020 | Kobayashi | G06Q 30/0259 |
| 2020/0265474 A1* | 8/2020 | Brown | G01C 21/3697 |
| 2020/0334592 A1* | 10/2020 | Garg | G06Q 20/40 |

* cited by examiner

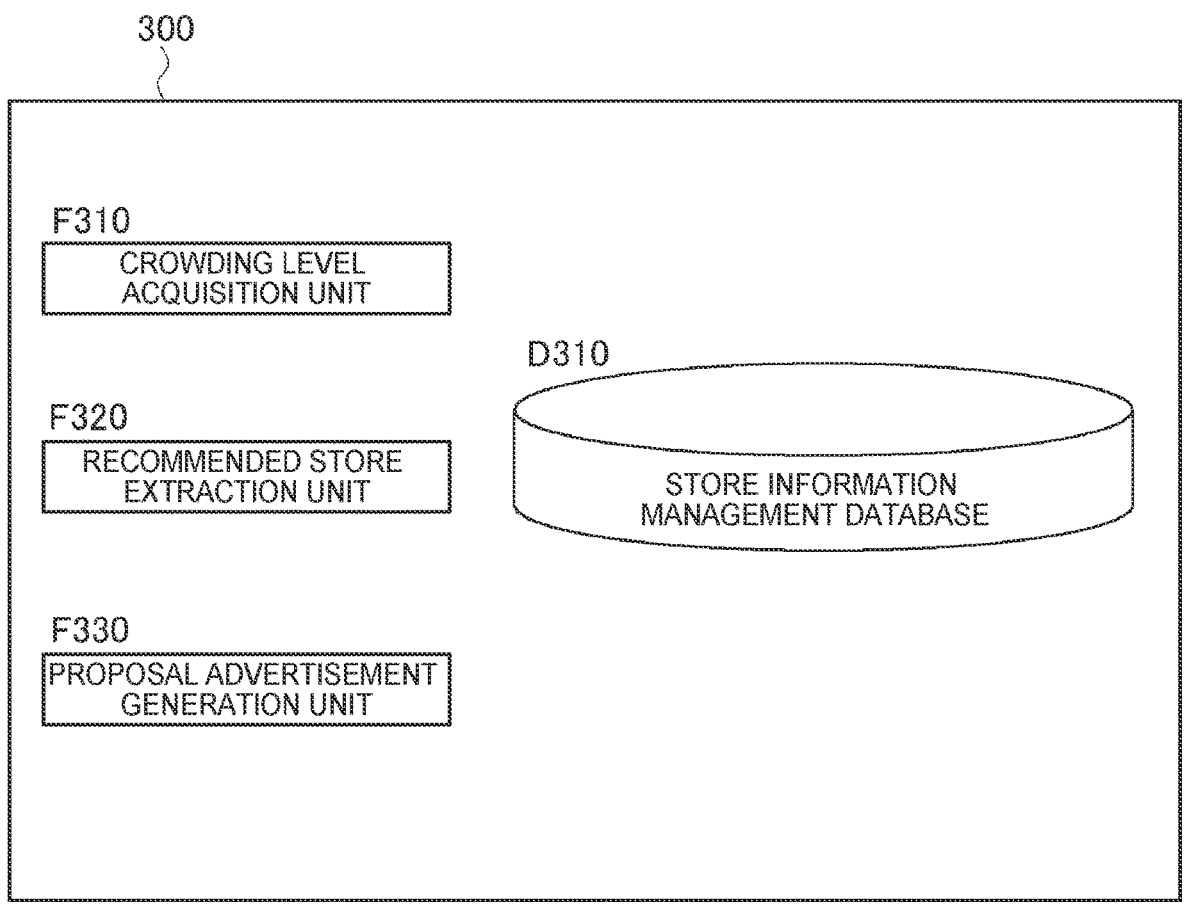

INFORMATION PROCESSING DEVICE, INFORMATION PROCESSING METHOD, AND NON-TRANSITORY STORAGE MEDIUM

INCORPORATION BY REFERENCE

The disclosure of Japanese Patent Application No. 2019-020458 filed on Feb. 7, 2019 including the specification, drawings and abstract is incorporated herein by reference in its entirety.

BACKGROUND

1. Technical Field

The present disclosure relates to an information processing device, an information processing method, and a non-transitory storage medium.

2. Description of Related Art

Conventionally, as one of the customer services, a technique is known for determining the content of a preferential service for customers based on the information indicating the crowding situation in the store, the remaining time until the store is closed, the inventory amount of the products, and the distance between a customer and the store and for providing the preferential service information, which indicates the determined content of the preferential service, to a terminal used by a customer (for example, Japanese Patent Application Publication No. 2016-126654 (JP 2016-126654 A)).

SUMMARY

The present disclosure provides a technique that can provide a highly convenient advertisement to a user who is in a vehicle traveling to a store.

According to one aspect of the present disclosure, an information processing device is provided. This information processing device includes a control unit configured to execute acquiring a crowding level of a destination store that is a destination of a vehicle in which a user rides, extracting a store with a crowding level lower than the crowding level of the destination store as a predetermined recommended store from among other stores that belong to the same genre as the destination store and that do not belong to the same affiliated group as the destination store when the crowding level of the destination store is higher than a predetermined threshold value, generating a proposal advertisement for proposing to change the destination of the vehicle from the destination store to the predetermined recommended store, and presenting the proposal advertisement to the user who rides in the vehicle via a mobile terminal that moves with the vehicle.

In the information processing device described above, the control unit may be configured to, when there is a plurality of stores with a crowding level lower than the crowding level of the destination store among the other stores that belong to the same genre as the destination store and that do not belong to the same affiliated group as the destination store, extract a store with a lowest crowding level as the predetermined recommended store from among the plurality of stores.

In the information processing device described above, the control unit may be configured to, when there is a plurality of stores with a crowding level lower than the crowding level of the destination store among the other stores that belong to the same genre as the destination store and that do not belong to the same affiliated group as the destination store, extract a store with a shortest distance from the destination store as the predetermined recommended store from among the plurality of stores.

In the information processing device described above, the proposal advertisement may include information about an incentive that is to be given to the user who rides in the vehicle when the user enters the predetermined recommended store.

In the information processing device described above, the proposal advertisement may include information indicating a crowding level of the predetermined recommended store.

According to another aspect of the present disclosure, an information processing method is provided. This information processing method includes acquiring, by a computer, a crowding level of a destination store that is a destination of a vehicle in which a user rides, extracting, by the computer, a store with a crowding level lower than the crowding level of the destination store as a predetermined recommended store from among other stores that belong to the same genre as the destination store and that do not belong to the same affiliated group as the destination store when the crowding level of the destination store is higher than a predetermined threshold value, generating, by the computer, a proposal advertisement for proposing to change the destination of the vehicle from the destination store to the predetermined recommended store, and presenting, by the computer, the proposal advertisement to the user who rides in the vehicle via a mobile terminal that moves with the vehicle.

According to still another aspect of the present disclosure, a non-transitory storage medium storing instructions that are executable by one or more processors and that cause the one or more processors to perform functions is provided. The functions include acquiring a crowding level of a destination store that is a destination of a vehicle in which a user rides, extracting a store with a crowding level lower than the crowding level of the destination store as a predetermined recommended store from among other stores that belong to the same genre as the destination store and that do not belong to the same affiliated group as the destination store when the crowding level of the destination store is higher than a predetermined threshold value, generating a proposal advertisement for proposing to change the destination of the vehicle from the destination store to the predetermined recommended store, and presenting the proposal advertisement to the user who rides in the vehicle via a mobile terminal that moves with the vehicle.

According to the present disclosure, it is possible to provide a highly convenient advertisement to a user who is in a vehicle traveling to a store.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a block diagram showing a functional configuration of the server device;

FIG. 4 is a diagram showing a configuration example of a store information table stored in a store information management database;

DETAILED DESCRIPTION OF EMBODIMENTS

Figure 1:
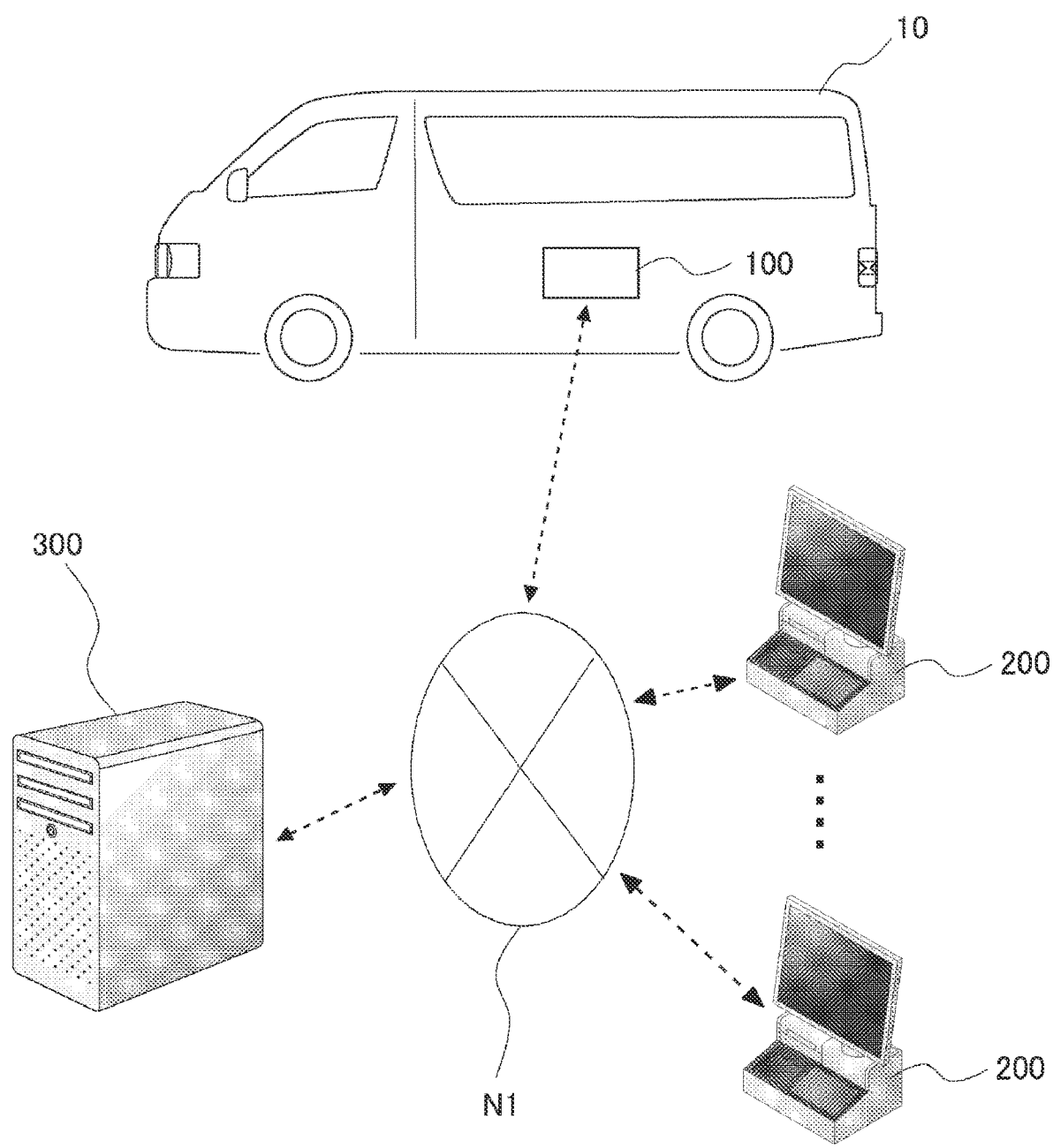
FIG. 1 is a schematic configuration diagram of a system for providing an advertisement delivery service in an embodiment.

The present disclosure provides an information processing device for delivering an advertisement to a user (customer) in a vehicle traveling to a store.

When the vehicle in which the user rides arrives at a store that is the destination (hereinafter called a destination store), the store is sometimes so crowded that the user cannot immediately enter the store. In such a case, there is a possibility that the user gives up entering the destination store and enters another store that belongs to the same genre as the destination store and that does not belong to the same affiliated group as the destination store. At that time, when there is no way of knowing the crowding level of other stores in advance, the user must move the vehicle to each of the other stores to check the crowding level. This requires user's extra time and effort. The term "genre" described above refers to the types of products and services that the store provides to customers. The term "affiliated group" described above refers to one or more stores managed and operated by the same entity (corporation or individual), for example, one or more stores that are operated by the same capital source such as corporate chain stores or one or more stores (franchisees) that are affiliated with the franchisor such as franchise chain stores.

To address the problem described above, the information processing device according to the present disclosure includes a control unit that acquires the crowding level of the store (destination store) that is the destination of the vehicle in which the user rides. At this time, when the acquired crowding level is higher than a predetermined threshold value, the control unit extracts a store with a crowding level lower than that of the destination store as a predetermined recommended store from among the other stores that belong to the same genre as the destination store and that do not belong to the same affiliated group as the destination store. After that, the control unit generates a proposal advertisement that is an advertisement for proposing to change the destination of the vehicle from the destination store to the predetermined recommended store. Then, the control unit presents the proposal advertisement to the user, who rides in the vehicle, via a mobile terminal that is a terminal moving with the vehicle.

The information processing device according to the present disclosure allows the user to recognize that the destination store is crowded and that there is another store (predetermined recommended store) with a crowding level lower than that of the destination store among the other stores that belong to the same genre as the destination store and do not belong to the same affiliated group as the destination store. Therefore, the information processing device can appeal to the user to change the destination of the vehicle from the destination store to the predetermined recommended store. If the destination of the vehicle is changed from the destination store to the predetermined recommended store, the user in the vehicle will give up entering the destination store and, therefore, the time and effort for the user to search for another store will be reduced. As a result, the information processing device can improve the convenience of the user in the vehicle traveling to a store. In the meantime, when the crowding level of the destination store is higher than the predetermined threshold value, it is also possible to extract another store that belongs to the same genre as the destination store and that belongs to the same affiliated group as the destination store as the predetermined recommended store. However, since such a store is likely to be located geographically away from the destination store, the user's travel distance and travel time become long with a possibility that it becomes difficult to increase user's convenience.

Note that, when there is a plurality of stores with a crowding level lower than that of the destination store among the other stores that belong to the same genre as the destination store and that do not belong to the same affiliated group as the destination store, the control unit may extract a store with the lowest crowding level as the predetermined recommended store from among the plurality of stores. By extracting such a store, the waiting time for the user to enter the store can be minimized when the destination of the vehicle is changed from the destination store to the predetermined recommended store. Alternatively, when there is a plurality of stores with a crowding level lower than that of the destination store among the other stores that belong to the same genre as the destination store and that do not belong to the same affiliated group as the destination store, the control unit may extract a store that is nearest from the destination store, or a store that is nearest from the current position of the vehicle, as the predetermined recommended store described above from among the plurality of stores. By extracting such a store, the change in the travel distance of the vehicle can be minimized when the destination of the vehicle is changed from the destination store to the predetermined recommended store. In addition, when there is a plurality of stores with a crowding level lower than that of the destination store among the other stores that belong to the same genre as the destination store and that do not belong to the same affiliated group as the destination store, the control unit may extract all the plurality of stores as the predetermined recommended stores described above. By extracting the plurality of stores in this way, the user can select a store from the plurality of predetermined recommended stores according to the preference of the user or a passenger.

The proposal advertisement may include the information on an incentive to be provided to the user when the user in the vehicle enters the predetermined recommended store. The "incentive" mentioned here is electronic data such as points, discount coupons, or gift certificates that can be used in the predetermined recommended store described above. A proposal advertisement that includes the information on such an incentive, if provided to the user, encourages the user to change the destination of the vehicle from the destination store to the predetermined recommended store.

<First Embodiment>

In this embodiment, an example will be described in which the present disclosure is applied to the advertisement delivery service that delivers advertisements to the users of vehicles traveling to a store. In this embodiment, the vehicle in which the user rides is a vehicle whose destination can be changed according to a user's request, such as a manually driven car or an autonomously driven car.

(System Configuration)

FIG. 1 is a diagram showing a configuration example of a system for providing the advertisement delivery service in this embodiment. In the example shown in FIG. 1, the advertisement delivery system includes a vehicle 10 in which the user rides, a mobile terminal 100 that moves with the vehicle 10, store terminals 200 each of which is installed in a store managed and operated by an advertiser, and a server device 300 installed in the company that provides the advertisement delivery service. In the example shown in FIG. 1, though only one vehicle 10 is shown as a vehicle in which the user rides, it is assumed that the advertisement delivery system includes a plurality of vehicles including the vehicle 10. It is also assumed that the advertisement delivery system includes as many store terminals 200 as the number of stores managed and operated by the advertisers. The mobile terminal 100 and the server device 300 can be connected to each other via a network N1. A wide area network (WAN), which is a global public communication network such as the Internet, or other communication networks may be used as the network N1. The network N1 may include a telephone communication network such as a mobile phone network and a wireless communication network such as Wi-Fi (registered trademark) network. The store terminals 200 and the server device 300 can be connected to each other via the network N1.

The mobile terminal 100, a terminal that moves with the vehicle 10, is for example a car navigation system mounted on the vehicle 10 or a mobile terminal carried by a user who rides in the vehicle 10. When the destination of the vehicle 10 is set, the mobile terminal 100 sends the information about the destination, which has been set, to the server device 300. For example, when the mobile terminal 100 is a car navigation system and the user sets a destination in the car navigation system, the mobile terminal 100 sends the information about the destination, which has been set, to the server device 300. When the mobile terminal 100 is a mobile terminal carried by the user and the user sets a destination in the car navigation application installed in the mobile terminal, the mobile terminal 100 sends the information about the destination, which has been set, to the server device 300. The mobile terminal 100 also has the function to present the advertisement information, provided from the server device 300, to the user, who is in the vehicle 10, via the display device of the mobile terminal 100.

The store terminal 200, a terminal that manages the crowding level of the store in which the store terminal 200 is arranged, sends the information indicating the store's crowding level to the server device 300. The information indicating the crowding level of the store is sent from the store terminal 200 to the server device 300 as appropriate. The information indicating the crowding level of the store may also be sent from the store terminal 200 to the server device 300 when a request to send the information indicating the crowding level is received from the server device 300. The "information indicating the crowding level" includes the information on the number of people who can enter the store, the waiting time before entering the store, and the number of vehicles that can park in the parking lot attached to the store, and the waiting time before parking in the parking lot attached to the store.

The server device 300 acquires the crowding level of the store (destination store) when information on a destination received from the mobile terminal 100 indicates a store managed and operated by an advertiser who subscribes to the advertisement delivery service. At this time, when the acquired crowding level is higher than the predetermined threshold value, the server device 300 extracts a store (predetermined recommended store) with a crowding level lower than that of the destination store from among the other stores that belong to the same genre as the destination store and that do not belong to the same affiliated group as the destination store. After that, the server device 300 generates an advertisement (proposal advertisement) that proposes to change the destination of the vehicle from the destination store to the predetermined recommended store and then sends the generated proposal advertisement to the mobile terminal 100. The server device 300 that has these functions corresponds to the "information processing device" in the present disclosure.

(Hardware Configuration)

Figure 2:
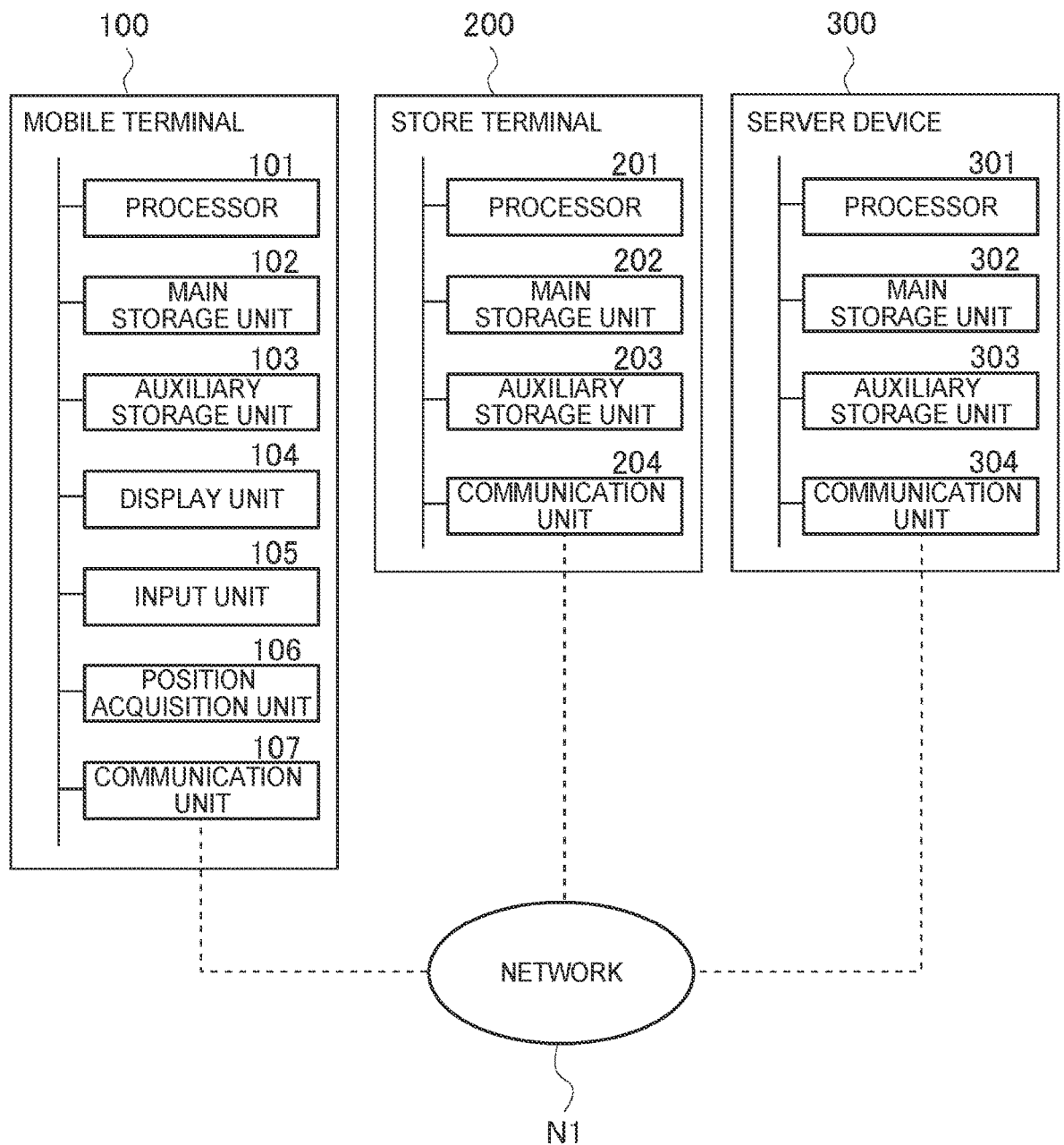
FIG. 2 is a diagram showing a hardware configuration of a mobile terminal, a store terminal, and a server device.

FIG. 2 is a diagram showing the hardware configuration of each of the mobile terminal 100, the store terminal 200, and the server device 300.

The server device 300 has the configuration of a standard computer. That is, the server device 300 includes a processor 301, a main storage unit 302, an auxiliary storage unit 303, and a communication unit 304. These units are connected to each other by a bus. The main storage unit 302 and the auxiliary storage unit 303 are computer-readable recording media. The hardware configuration of the computer is not limited to the example shown in FIG. 2. Any components may be omitted or replaced, or any component may be added, as appropriate.

In the server device 300, the processor 301 loads a program, stored in the storage medium, into the work area of the main storage unit 302 for execution. The functional units are controlled through the execution of the program to implement their functions that meet the predetermined purpose.

The processor 301 is, for example, a central processing unit (CPU) or a digital signal processor (DSP). The processor 301 controls the server device 300 to perform various information processing operations. The main storage unit 302 includes, for example, a random access memory (RAM) and a read only memory (ROM). The auxiliary storage unit 303 is, for example, an erasable programmable ROM (EPROM) or a hard disk drive (HDD). The auxiliary storage unit 303 may also include a removable medium, that is, a portable storage medium. The removable medium is a universal serial bus (USB) memory or a disk storage medium such as a compact disc (CD), a digital versatile disc (DVD), or the like.

The auxiliary storage unit 303 stores various programs, various data, and various tables in a manner they are read from, or written into, a storage medium as necessary. The auxiliary storage unit 303 stores the operating system (OS), various programs, various tables, and the like. These pieces of information may be stored, in part or in whole, in the main storage unit 302. Conversely, the information stored in the main storage unit 302 may be stored in the auxiliary storage unit 303.

The communication unit 304 sends and receives information between an external device and the server device 300. The communication unit 304 is, for example, a local area network (LAN) interface board or a wireless communication circuit for wireless communication. The LAN interface board and the wireless communication circuit are connected to the network N1.

A series of processing performed by the server device 300, configured as described above, may be performed by hardware but may also be performed by software.

Next, the mobile terminal 100 is a small computer that can be carried by the user, such as a smartphone, a mobile phone, a tablet terminal, a personal information terminal, and a wearable computer (smart watch, etc.). The mobile terminal 100 may be a car navigation system mounted on the vehicle 10 and connectable to the server device 300 via the network N1. The mobile terminal 100 may also be a personal computer (PC) connected to the server device 300 via the network N1.

As shown in FIG. 2, the mobile terminal 100 includes a processor 101, a main storage unit 102, an auxiliary storage unit 103, a display unit 104, an input unit 105, a position acquisition unit 106, and a communication unit 107. Since the processor 101, main storage unit 102, and auxiliary storage unit 103 are the same as the processor 301, main storage unit 302, and auxiliary storage unit 303 of the server device 300, the description is omitted. The display unit 104 is, for example, a liquid crystal display (LCD) or an electroluminescence (EL) panel. The input unit 105 includes, for example, a touch panel through which the user can enter symbols such as characters, a push button, and a microphone through which the user can enter voices. The position acquisition unit 106, which acquires the current position of the mobile terminal 100, is typically configured to include a GPS receiver. The communication unit 107 is a communication circuit that accesses the network N1 using, for example, a mobile communication service (telephone communication network such as a mobile phone or wireless communication such as WiFi) for performing data communication with the server device 300.

The store terminal 200 is a small computer that can be carried by store employees, such as a smartphone, a mobile phone, a tablet terminal, a personal information terminal, or a wearable computer (smart watch, etc.). The store terminal 200 may be a point of sale (POS) terminal installed in the store and connected to the server device 300 via the network N1 or may be a personal computer (PC) connected to the device 300 via the network N1.

The store terminal 200 includes a processor 201, a main storage unit 202, an auxiliary storage unit 203, and a communication unit 204. Since the processor 201, main storage unit 202, auxiliary storage unit 203, and communication unit 204 are the same as the processor 301, main storage unit 302, auxiliary storage unit 303, and communication unit 304 of the server device 300, the description is omitted.

(Functional Configuration of Server Device)

The functional configuration of the server device 300 will be described with reference to FIG. 3. As shown in FIG. 3, the server device 300 in this embodiment includes the following functional components: crowding level acquisition unit F310, recommended store extraction unit F320, proposal advertisement generation unit F330, and store information management database D310. The crowding level acquisition unit F310, recommended store extraction unit F320, and proposal advertisement generation unit F330 are generated by the processor 301 of the server device 300 through the execution of computer programs loaded into the main storage unit 302. Note that any one of the crowding level acquisition unit F310, recommended store extraction unit F320, and proposal advertisement generation unit F330, or a part of any one of those units, may be configured by a hardware circuit.

The store information management database D310 is built by managing the data, stored in the auxiliary storage unit 303, through the execution of the database management system (DBMS) program that is executed by the processor 301 of the server device 300. The store information management database D310 built in this way is, for example, a relational database.

Note that any one of the functional components of the server device 300, or a part of its processing, may be executed by another computer connected to the network N1. For example, the processing included in the crowding level acquisition unit F310, the processing included in the recommended store extraction unit F320, and the processing included in the proposal advertisement generation unit F330 may be executed by separate computers.

The store information management database D310 stores the information on the stores managed and operated by advertisers who subscribe to the advertisement delivery service. In this database, the information for identifying the genre of each store and the information on the store are associated with each other. An example of the configuration of store information stored in the store information management database D310 will be described with reference to FIG. 4. FIG. 4 is a diagram showing an example of the configuration of a store information table. The information registered in the store information table is not limited to the example shown in FIG. 4, and fields can be added, changed, and deleted as appropriate.

The store information table shown in FIG. 4 has the following fields: genre ID, advertiser ID, store name, store location, in-store crowding, and waiting group. In the example shown in FIG. 4, since four stores belong to the same genre, the information on the four stores (advertiser ID field, store name field, store location field, in-store crowding field, and waiting group field) are associated with one genre ID. In the genre ID field, the information for identifying the genre, to which the associated stores belong, is registered (for example, hamburger shop, Italian restaurant, French restaurant, beef barbecue restaurant, sushi restaurant, shoe store, convenience store, home center, etc.). In the advertiser ID field, the advertiser ID for identifying the person (advertiser) who manages and operates each store is registered. The advertiser ID is given when each advertiser becomes a member of the advertisement delivery service. In the store name field, the information indicating the store name of each store is registered. In the store location field, the information indicating the location of each store is registered (for example, the information indicating the address, the information indicating latitude/longitude, etc.). In the in-store crowding field, the information indicating the crowding level in each store is registered. For example, "full" is registered when the store is full, and "empty" is registered when the store is not full (when there is an empty seat in the store). In the waiting group field, the number of user groups waiting to enter the store (user groups waiting for seats to become empty) is registered. For example, "3" is registered when three user groups are waiting to enter the store, and "0" is registered when there is no group waiting to enter the store.

The information registered in the in-store crowding field and the waiting group field of the store information table is provided from the store terminal 200 of each store to the server device 300 as described above. At that time, the information indicating the crowding level in the store (information indicating whether the store is full or empty) and the number of user groups waiting to enter the store may be entered into the store terminal 200 by an employee of the store. It is also possible to determine the crowding level in the store and the number of user groups waiting to enter the store by causing the processor 201 of the store terminal 200 to analyze the images generated by capturing the inside and outside of the store with the camera.

When the store has a parking lot, a field may be added to register the information indicating the crowding level of the parking lot (information indicating whether the parking lot is full or empty, the number of vehicles waiting to park when the parking lot is full, etc.).

The crowding level acquisition unit F310 acquires the crowding level of a store as follows. When a store managed and operated by an advertiser who subscribes to the advertisement delivery service is set as the destination of the vehicle 10, the crowding level acquisition unit F310 acquires the crowding level of the store that is the destination (destination store). More specifically, when the server device 300 receives the information indicating the destination of the vehicle 10 (hereinafter, also referred to as "destination information") from the mobile terminal 100, the crowding level acquisition unit F310 first determines whether the destination of the vehicle 10 is a store managed and operated by an advertiser who subscribes to the advertisement delivery service. When the information indicating the name of the destination is sent from the mobile terminal 100 to the server device 300 as the destination information, the crowding level acquisition unit F310 accesses the store information management database D310 to search for a store information table in which the store name that matches the name of the destination is registered in the store name field. If the store information management database D310 stores a store information table in which the store name that matches the name of the destination is registered in the store name field, the crowding level acquisition unit F310 determines that the destination of the vehicle 10 is a store managed and operated by the advertiser. On the other hand, when the information indicating the location of the destination is sent from the mobile terminal 100 to the server device 300 as the destination information, the crowding level acquisition unit F310 accesses the store information management database D310 to search for a store information table in which the store location that matches the location of the destination is registered in the store location field. If the store information management database D310 stores a store information table in which the store location that matches the location of the destination is registered in the store location field, the crowding level acquisition unit F310 determines that the destination of the vehicle 10 is a store managed and operated by the advertiser. When it is determined, as a result of the above method, that the destination of the vehicle 10 is a store managed and operated by the advertiser, the crowding level acquisition unit F310 reads the information registered in the in-store crowding field of the destination store and the information registered in the waiting group field from the store information table in which the store name that matches the name of the destination is registered in the in the store name field (or from the store information table in which the store location that matches the location of the destination is registered in the store location field). In this way, the crowding level of the destination store is acquired.

The recommended store extraction unit F320 extracts a predetermined recommended store as follows. When the crowding level acquired by the crowding level acquisition unit F310 is higher than the predetermined threshold value, the recommended store extraction unit F320 extracts a store that does not belong to the same affiliated group as the destination store and that has a crowding level lower than that of the destination store as the predetermined recommended store from among the other stores that belong to the same genre as the destination store. More specifically, the recommended store extraction unit F320 first determines whether the crowding level, acquired by the crowding level acquisition unit F310, is higher than the predetermined threshold value. The "predetermined threshold value" mentioned above corresponds to a crowding level at which it is expected that the time required from the time the vehicle 10 arrives at the destination store to the time the user who has been riding in the vehicle 10 enters the destination store (that is, waiting for entry) is relatively long (for example, the crowding level at which the destination store is full and the number of waiting user groups is equal to or greater than the predetermined number of groups and/or the destination store parking lot is full and the number of vehicles waiting to park is equal to or greater than the predetermined number of vehicles). When the crowding level of the destination store is equal to or higher than the predetermined threshold value, the recommended store extraction unit F320 first accesses the store information table associated with the genre ID of the genre to which the destination store belongs. Then, the recommended store extraction unit F320 extracts a store that is associated with an advertiser ID different from that of the destination store and that has a crowding level lower than that of the destination store as the predetermined recommended store from among the other stores registered in the store information table. At this time, when there is a plurality of stores with a crowding level lower than that of the destination store, the store that has the lowest crowding level among the stores may be extracted as the predetermined recommended store. In the example shown in FIG. 4 described above, when "□□□" is the destination store, three stores, "ooo", "ΔΔΔ", and "xxx", correspond to the stores associated with the advertiser IDs different from that of the destination store. Of these stores, two stores, "ΔΔΔ" and "xxx", are stores that have a crowding level lower than that of the destination store. Of these "ΔΔΔ" and "xxx", the store with the lowest crowding level is "ΔΔΔ". Therefore, "ΔΔΔ" may be extracted as the predetermined recommended store.

Figure 5:
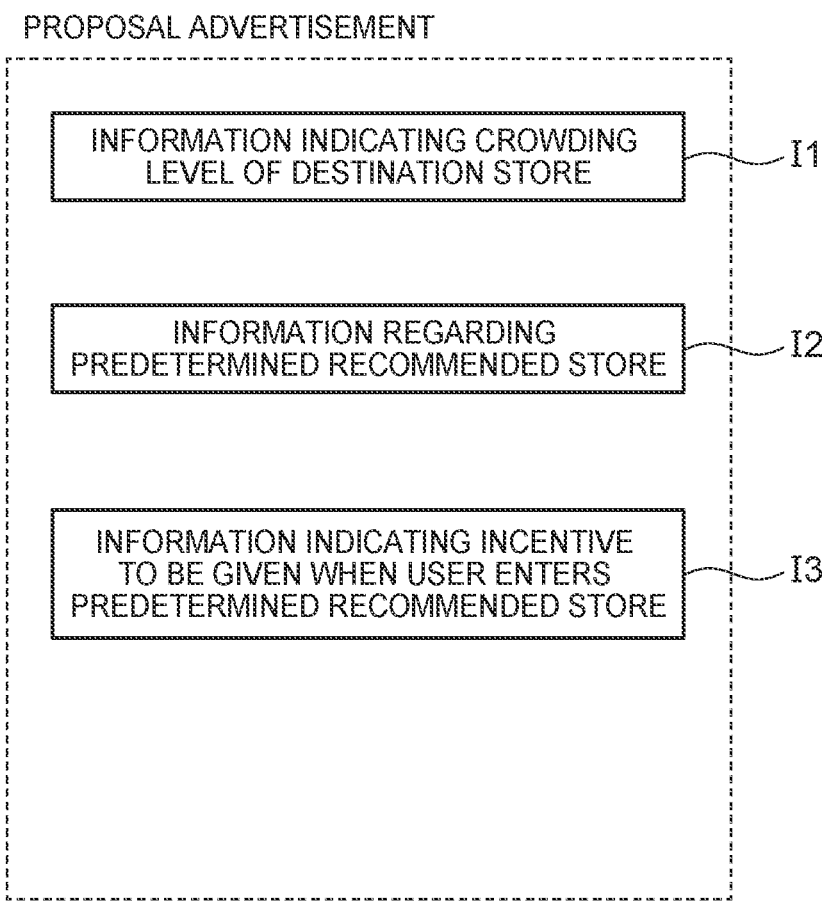
FIG. 5 is a diagram showing an example of a proposal advertisement in the embodiment.

The proposal advertisement generation unit F330 generates a proposal advertisement for proposing to change the destination of the vehicle 10 from the destination store to the predetermined recommended store. For example, as shown in FIG. 5, the proposal advertisement in this embodiment includes the following information: the information indicating the crowding level of the destination store (reference numeral: I1), the information regarding the predetermined recommended store (reference numeral: I2), and the information indicating the incentive to be given to the user of the vehicle 10 when the user enters the predetermined recommended store (reference numeral: I3). The information indicating the crowding level of the destination store indicates the in-store crowding level of the destination store and the number of user groups waiting to enter the store (and/or the crowding level of the destination store's parking lot and the number of vehicles waiting to park). To generate this information, the information registered in the in-store crowding field and the waiting group field of the store information table corresponding to the destination store is used. The information regarding the predetermined recommended store includes the information indicating the store name, the store location, and the crowding level of the predetermined recommended store. The information indicating the crowding level of the predetermined recommended store indicates the in-store crowding level of the predetermined recommended store and the number of user groups waiting to enter the store (and/or the crowding level of the predetermined recommended store's parking lot and the number of vehicles waiting to park). To generate this information, the information registered in the in-store crowding field and the waiting group field of the store information table corresponding to the predetermined recommended store is used. The information indicating the incentive is electronic data such as points, discount tickets, or gift certificates that can be used in the predetermined recommended store when the user of the vehicle 10 enters the predetermined recommended store. The information indicating the incentive may be set in advance for each store or may be changed according to the distance from the destination store to the predetermined recommended store (for example, the greater the distance from the destination store to the predetermined recommended store, the more incentives may be given to the user). The proposal advertisement generated by the proposal advertisement generation unit F330 is sent from the communication unit 304 to the mobile terminal 100. When the proposal advertisement, sent from the server device 300 in this way, is received by the communication unit 107 of the mobile terminal 100, the processor 101 causes the display unit 104 to display the proposal advertisement to present the proposal advertisement to the user in the vehicle 10. The proposal advertisement, when presented to the user in this way, allows the user in the vehicle 10 to recognize the crowding level of the destination store and to recognize the predetermined recommended store with a crowding level lower than that of the destination store.

(Processing Flow)

Figure 6:
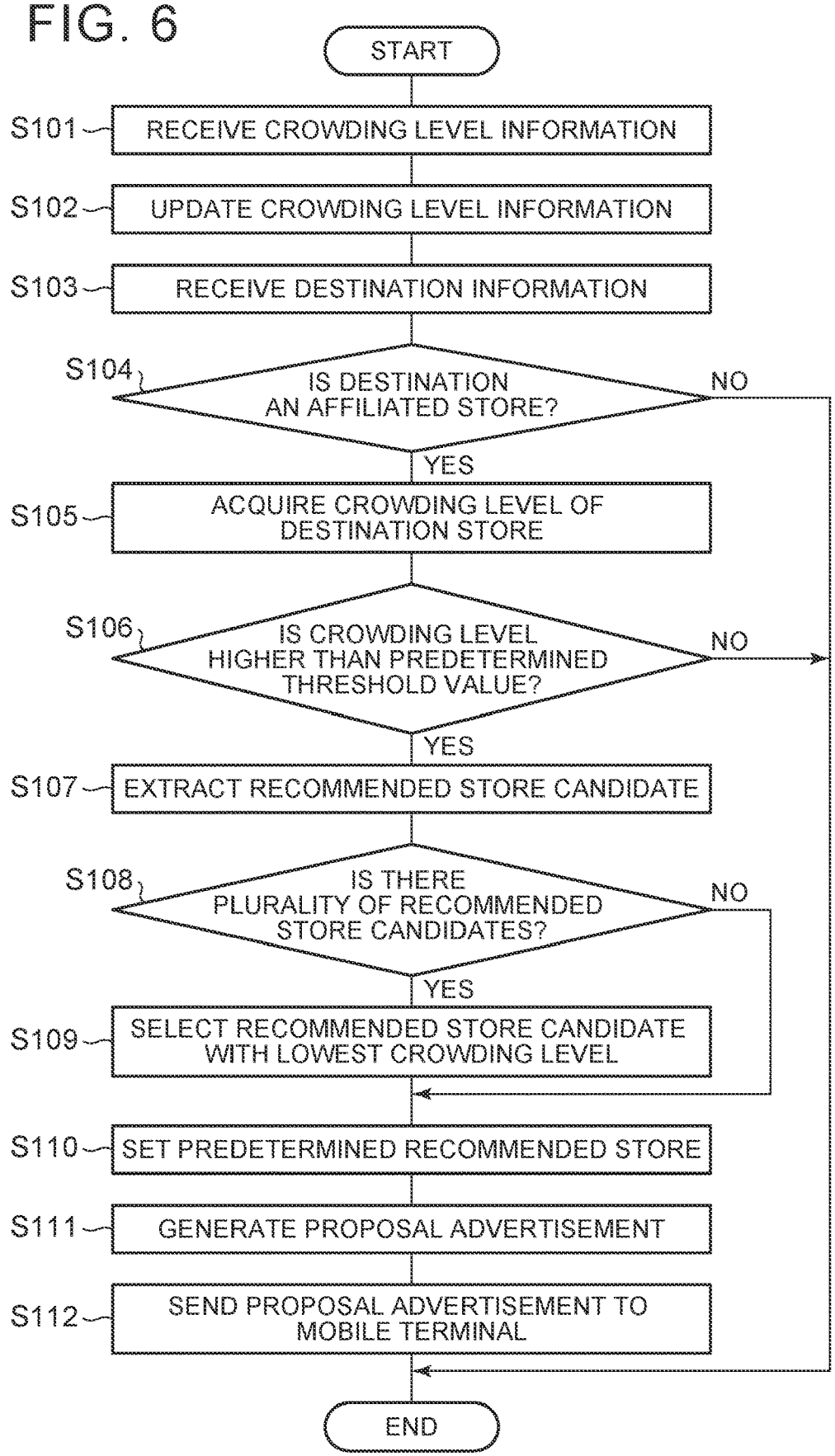
FIG. 6 is a flowchart showing the processing performed by the server device.

The processing flow of the server device 300 in this embodiment will be described below with reference to FIG. 6. FIG. 6 is a flowchart of the processing performed by the server device 300.

In FIG. 6, the server device 300 first receives the information (crowding level information) indicating the crowding level of each store (step S101). More specifically, at each store terminal 200, an employee of each store first enters the crowding level information (the information about the in-store crowding level of the store and the number of user groups waiting to enter the store and/or the information about the crowding level of the parking lot and the number of vehicles waiting to park). When the crowding level information on each store is updated in this way, the updated crowding level information is sent from the communication unit 207 of the store terminal 200 to the server device 300. As a result, the server device 300 receives the information indicating the crowding level of each store. Note that the genre ID of the genre, to which each store belongs, and the store name of each store are added to the crowding level information sent from the store terminal 200 to the server device 300.

In step S102, the server device 300 updates the information registered in the in-store crowding field and the waiting group field of the store information table, stored in the store information management database D310, using the crowding level information received in step S101. More specifically, the server device 300 accesses the store information table that is one of the store information tables stored in the store information management database D310 and that corresponds to the genre ID added to the crowding level information. Next, using the crowding level information, the server device 300 updates the information registered in the in-store crowding field and the waiting group field of the store information table corresponding to the store. This store is one of the stores registered in the store information table corresponding to the genre ID and that corresponds to the store name added to the crowding level information.

In step S103, the server device 300 receives the information indicating the destination of the vehicle 10 (destination information). More specifically, the user in the vehicle 10 first sets the destination of the vehicle 10 using the mobile terminal 100. When the destination of the vehicle 10 is set in this way, the information indicating the destination (the information indicating the name of the destination or the location of the destination) is sent from the communication unit 107 of the mobile terminal 100 to the server device 300. Then, the server device 300 receives the destination information.

In step S104, based on the destination information received in step S103, the server device 300 determines whether the store at the destination of the vehicle 10 is a store (affiliated store) managed and operated by an advertiser who subscribes to the advertisement delivery service. More specifically, as described above, the crowding level acquisition unit F310 accesses the store information management database D310 to search for a store information table in which the store name or the store location that matches the destination information (the name or location of the destination) is registered in the store name field or in the store location field. When the store information management database D310 does not store a store information table in which the store name or the store location that matches the destination information is registered in the store name field or the store location field, the determination in step S104 is negative. When the determination in step S104 is negative, the server device 300 terminates the processing. On the other hand, when the store information management database D310 stores a store information table in which the store name or the store location that matches the destination information is registered in the store name field or the store location field, the determination in step S104 is affirmative. When the determination in step S104 is affirmative, the processing of the server device 300 proceeds to step S105.

In step S105, the server device 300 acquires the crowding level of the store (destination store) that is set as the destination of the vehicle 10. More specifically, the crowding level acquisition unit F310 of the server device 300 accesses the store information table in which the destination store is registered and reads the information registered in the in-store crowding field and the waiting group field of the record corresponding to the destination store to acquire the crowding level of the destination store.

In step S106, the recommended store extraction unit F320 of the server device 300 determines whether the crowding level, acquired in step S105, is higher than the predetermined threshold. In this step, when there are empty seats in the destination store, or when the destination store is full but the number of user groups waiting to enter the store is less than the predetermined number, the determination in step S106 is negative. When the determination in step S106 is negative, the server device 300 terminates the processing. On the other hand, when the destination store is full and the number of user groups waiting to enter the store is equal to or greater than the predetermined number, the determination in step S106 is affirmative. When the determination in step S106 is affirmative, the processing of the server device 300 proceeds to step S107.

In step S107, the recommended store extraction unit F320 of the server device 300 accesses the store information table corresponding to the same genre ID with which the destination store is associated. From that store information table, the recommended store extraction unit F320 extracts a store (recommended store candidate) that is associated with an advertiser ID different from that of the destination store and that has a crowding level lower than that of the destination store. In extracting such a store, the stores located excessively away from the destination store may be excluded from the recommended store candidates in order to make the proposal advertisement more appealing. That is, as the recommended store candidate, the recommended store extraction unit F320 may extract a store that is one of the stores associated with an advertiser ID different from that of the destination store, that is located within a range in which the distance from the destination store is equal to or less than the predetermined distance, and that has a crowding level lower than the destination store.

In step S108, the recommended store extraction unit F320 of the server device 300 determines whether a plurality of recommended store candidates has been extracted in step S107. When the determination in step S108 is affirmative, the recommended store extraction unit F320 selects a recommended store candidate with the lowest crowding level from the plurality of recommended store candidates (step S109). Then, the recommended store extraction unit F320 sets the recommended store candidate, selected in step S109, as the predetermined recommended store (step S110). On the other hand, when the determination in step S108 is negative, the recommended store extraction unit F320 skips step S109 and the processing proceeding to step S110. In step S110, the recommended store extraction unit F320 sets the recommended store candidate, extracted in step S107, as the predetermined recommended store.

In step S111, the server device 300 generates a proposal advertisement. More specifically, the proposal advertisement generation unit F330 of the server device 300 generates a proposal advertisement including the following: the information indicating the crowding level of the destination store, the information on the predetermined recommended store that was set in step S110 described above (the information indicating the store name, location, and crowding level of the predetermined recommended store), and the information indicating the incentives to be given to the user when the user enters the predetermined recommended store (see FIG. 5 given above). In this case, the proposal advertisement may include not only the information described above but also the information on the time at which the vehicle 10 is predicted to arrive at the predetermined recommended store (estimated arrival time). In estimating the arrival time, the proposal advertisement generation unit F330 may calculate the estimated arrival time based on the distance from the current position of the vehicle 10 to the predetermined recommended store and the traffic congestion information on the route from the current position of the vehicle 10 to the predetermined recommended store. The information included in the proposal advertisement is not limited to the information described above. The information included in the proposal advertisement is required only to include at least the information necessary for the user to recognize that the waiting time for entering the predetermined recommended store is shorter than the waiting time for entering the destination store and the information necessary for changing the destination of the vehicle 10 from the destination store to the predetermined recommended store.

In step S112, the server device 300 sends the proposal advertisement, generated in step S111, to the mobile terminal 100. When sending the proposal advertisement, the signal requesting to display the proposal advertisement on the display unit 104 of the mobile terminal 100 may be added to the proposal advertisement. Then, when the communication unit 107 of the mobile terminal 100 receives the proposal advertisement sent from the server device 300, the processor 101 of the mobile terminal 100 displays the above proposal advertisement on the display unit 104 to present it to the user.

According to the flow described above, when a store with a crowding level higher than the predetermined threshold value is set as the destination store, the user can recognize that the destination store is crowded and that there is a store (predetermined recommended store) with a crowding level lower than that of the destination store among the other stores that belong to the same genre as the destination store and that do not belong to the same affiliated group as the destination store. In addition, the proposal advertisement displayed as a result of the processing of this flow appeals to the user that the destination of the vehicle 10 is to be changed from the destination store to the predetermined recommended store. If the proposal advertisement appeals to the user so much that the user changes the destination of the vehicle 10 from the destination store to the recommended store, the time and effort that will be required when the user of the vehicle 10 gives up entering the destination store and then searches for another store can be reduced. As a result, user convenience can be improved. In addition, the crowding level is adjusted between the destination store and the predetermined recommended store.

In addition, since a proposal advertisement in this embodiment includes the information on incentives that will be given to the user when the user enters the recommended store, the user is encouraged to change the destination of the vehicle 10 from the destination store to the recommended store. The information on the incentives included in a proposal advertisement increases its appealing power, further reducing the crowding level of the destination store.

In this embodiment, since a proposal advertisement is presented to the user before the vehicle 10 arrives at the destination store (with the destination store specified as the destination of the vehicle 10), the user can change the destination of the vehicle 10 from the destination store to the predetermined recommended store before arriving at the destination. As a result, the user is less likely to have a sense of futility in this case as compared with the case in which the user changes the destination after the vehicle 10 arrives at the destination.

<Modification>

The above embodiment is merely an example, and the present disclosure may be implemented with appropriate modifications within a range not departing from the spirit thereof.

For example, in the first embodiment described above, when there is a plurality of stores (recommended store candidates) with a crowding level lower than that of the destination store, the recommended store candidate with the lowest crowding level among the plurality of recommended store candidates is set as the predetermined recommended store. Instead, among the plurality of recommended store candidates, the recommended store candidate with the shortest distance from the destination store may be set as the predetermined recommended store. When the predetermined recommended store is set in this way, a changes in the vehicle travel distance due to a change in the vehicle destination from the destination store to the predetermined recommended store can be minimized. As a result, user's resistance to a change in the destination of the vehicle from the destination store to the predetermined recommended store is reduced. Alternatively, when there is a plurality of stores (recommended store candidates) with a crowding level lower than that of the destination store, the recommended store candidate with the shortest distance from the current position of the vehicle may be extracted as the predetermined recommended store from the plurality of recommended store candidates. When the predetermined recommended store is set in this way, the travel distance from the current position of the vehicle to the predetermined recommended store can be minimized when the destination of the vehicle is changed from the destination store to the predetermined recommended store. Furthermore, when there is a plurality of stores (recommended store candidates) with a crowding level lower than that of the destination store, all of the plurality of recommended store candidates may be proposed to the user as predetermined recommended stores. In this case, the user or a passenger in the same vehicle as the user can select a favorite store from the plurality of stores.

In the example in the first embodiment described above, a proposal advertisement includes the information indicating the crowding level of the destination store, the information on the predetermined recommended store that was set in step S110 described above, and the information indicating the incentives to be given to the user when the user enters the predetermined recommended store. In addition to the above three pieces of information, the proposal advertisement may include a time when the vehicle is predicted to arrive at the predetermined recommended store (estimated arrival time). In estimating the arrival time, the proposal advertisement generation unit may calculate the estimated arrival time based on the distance from the current position of the vehicle to the predetermined recommended store and the traffic congestion information on the traveling route from the current position of the vehicle to the predetermined recommended store. Such a proposal advertisement, if presented to the user, makes it easier for the user to make a schedule when considering whether to change the destination of the vehicle from the destination store to the predetermined recommended store. In addition, when the user performs an operation on the mobile terminal to change the destination from the destination store to the predetermined recommended store, the estimated arrival time of the user, as well as a reservation request for a seat in the store, may be sent from the server device to the predetermined recommended store. Sending such information improves the convenience of the user when the destination of the vehicle is changed from the destination store to the predetermined recommended store. In addition, the information on such services, if included in the proposal advertisement, further enhances the appeal power of the proposal advertisement.

In the first embodiment described above, the server device directly communicates with the store terminals of affiliated stores to obtain the crowding level of each store. It is also possible to arrange a management server device in the company that manages and operates the affiliated stores so that the management server device can collect the information on the crowding levels of the affiliated stores and, at the same time, provide the information on the collected crowding levels from the management server device to the server device.

<Others>

The embodiment described above is merely an example, and the present disclosure can be implemented by adding charges, as necessary, within a range not departing from the spirit thereof.

The processing and the units described in this disclosure can be implemented in any combination as long as no technical contradiction occurs. The processing described as being performed by one device may be performed by two or more devices in a shared manner. Conversely, the processing described as being performed by different devices may be performed by one device. In the computer system, the hardware configuration for implementing each function can be flexibly changed.

The present disclosure can also be implemented by supplying a computer program that implements the functions, which are described in the embodiment and modifications above, to a computer so that one or more processors of the computer can read and execute the program. Such a computer program may be provided to a computer using a non-transitory computer-readable storage medium that stores instructions executable by one or more processors, that causes the one or more processors to execute the functions described above, and that can be connected to the computer system bus. A non-transitory computer-readable storage medium is a computer-readable storage medium that stores information, such as data and programs, by electrical, magnetic, optical, mechanical, or chemical action. For example, the recording medium is any type of disk such as a magnetic disk (floppy (registered trademark) disk, hard disk drive (HDD), etc.) and an optical disc (CD-ROM, DVD disc, Blu-ray disc, etc.), a read-only memory (ROM), a random access memory (RAM), an EPROM, an EEPROM, a magnetic card, a flash memory, an optical card, or a solid state drive (SSD). Such a computer program may be provided to a computer via a network.

What is claimed is:

1. An information processing device comprising:
   a processor configured to:
      acquire a crowding level of a destination store that is a destination of a vehicle in which a user rides;
      access, in a database, a store information table associated with a genre identifier that matches a genre identifier of the destination store;
      extract, from the store information table, a store with a crowding level lower than the crowding level of the destination store and that is associated with an advertiser identifier that is different than an advertiser identifier of the destination store as a predetermined recommended store from among other stores that belong to the same genre as the destination store and that do not belong to the same affiliated group as the destination store based on the crowding level of the destination store being greater than a predetermined threshold value;
      generate a proposal advertisement for proposing to change the destination of the vehicle from the destination store to the predetermined recommended store;
      dynamically determine an amount of incentive to include with the proposal advertisement, based on a current distance between the destination store and the predetermined recommended store; and
      transmit, via a network and to a mobile terminal that moves with the vehicle, the proposal advertisement and the incentive to cause the mobile terminal to display the proposal advertisement and the incentive to the user who rides in the vehicle.

2. The information processing device according to claim 1 wherein the processor is configured to, when there is a plurality of stores with a crowding level lower than the crowding level of the destination store among the other stores that belong to the same genre as the destination store and that do not belong to the same affiliated group as the destination store, extract a store with a lowest crowding level as the predetermined recommended store from among the plurality of stores.

3. The information processing device according to claim 1 wherein the processor is configured to, when there is a plurality of stores with a crowding level lower than the crowding level of the destination store among the other stores that belong to the same genre as the destination store and that do not belong to the same affiliated group as the destination store, extract a store with a shortest distance from the destination store as the predetermined recommended store from among the plurality of stores.

4. The information processing device according to claim 1 wherein the proposal advertisement includes information about the incentive that is to be given to the user who rides in the vehicle when the user enters the predetermined recommended store.

5. The information processing device according to claim 4 wherein the proposal advertisement includes information indicating a crowding level of the predetermined recommended store.

6. The information processing device according to claim 1, wherein the affiliated group includes one or more stores managed and operated by a same entity.

7. The information processing device according to claim 1, wherein the affiliated group includes one or more stores affiliated with a same franchisor.

8. The information processing device according to claim 1, wherein the processor is configured to:
receive, from the mobile terminal, information identifying the destination store based on the user setting the destination store as the destination in a car navigation application installed in the mobile terminal; and
acquire the crowding level of the destination store based on receiving, from the mobile terminal, the information identifying the destination store.

9. The information processing device according to claim 5, wherein the information indicating the crowding level of the predetermined recommended store includes at least one of a number of user groups waiting to enter the predetermined recommended store or a number of vehicles waiting to park in a parking lot associated with the predetermined recommended store.

10. The information processing device according to claim 1, wherein the processor is configured to:
receive, from the mobile terminal, information indicating a name of the destination store;
access, in a database, a store information table in which a store name matches the name of the destination store; and
acquire the crowding level of the destination store based on accessing the store information table.

11. The information processing device according to claim 1, wherein the processor is configured to:
receive, from the mobile terminal, information indicating a location of the destination store;
access, in a database, a store information table in which a location matches the location of the destination store; and
acquire the crowding level of the destination store based on accessing the store information table.

12. The information processing device according to claim 1, wherein the processor is configured to:
receive, from a store terminal of the destination store, information indicating the crowding level of the destination store including at least one of a number of user groups waiting to enter the destination store or a number of vehicles waiting to park in a parking lot associated with the destination store;
store, in the store information table of the database, the information indicating the crowding level of the destination store; and
acquire the crowding level of the destination store based on storing the information indicating the crowding level of the destination store in the store information table of the database.

13. The information processing device according to claim 1, wherein the processor is configured to:
determine whether the destination store is managed and operated by an advertiser who subscribes to an advertisement delivery service; and
acquire the crowding level of the destination store based on determining that the destination store is managed and operated by the advertiser who subscribes to the advertisement delivery service.

14. The information processing device according to claim 1, wherein the processor is configured to:
determine that a number of user groups waiting to enter the destination store is equal to or greater than a predetermined number; and
determine that the crowding level of the destination store is greater than the predetermined threshold value based on determining that the number of user groups waiting to enter the destination store is equal to or greater than the predetermined number.

15. The information processing device according to claim 1, wherein the processor is configured to:
determine that the predetermined recommended store is associated with a different affiliated group than the destination store; and
extract the predetermined recommended store based on determining that the predetermined recommended store is associated with a different affiliated group than the destination store.

16. An information processing method comprising:
acquiring, by a computer, a crowding level of a destination store that is a destination of a vehicle in which a user rides;
accessing, by the computer and in a database, a store information table associated with a genre identifier that matches a genre identifier of the destination store;
extracting, by the computer and from the store information table, a store with a crowding level lower than the crowding level of the destination store and that is associated with an advertiser identifier that is different than an advertiser identifier of the destination store as a predetermined recommended store from among other stores that belong to the same genre as the destination store and that do not belong to the same affiliated group as the destination store based on the crowding level of the destination store being greater than a predetermined threshold value;
generating, by the computer, a proposal advertisement for proposing to change the destination of the vehicle from the destination store to the predetermined recommended store;
dynamically determine, by the computer, an amount of incentive to include with the proposal advertisement, based on a current distance between the destination store and the predetermined recommended store; and
transmitting, by the computer via a network and to a mobile terminal that moves with the vehicle, the proposal advertisement and the incentive to cause the mobile terminal to display the proposal advertisement and the incentive to the user who rides in the vehicle.

17. A non-transitory storage medium storing instructions that are executable by one or more processors and that cause the one or more processors to perform functions comprising:
acquiring a crowding level of a destination store that is a destination of a vehicle in which a user rides;
accessing, in a database, a store information table associated with a genre identifier that matches a genre identifier of the destination store;

extracting, from the store information table, a store with a crowding level lower than the crowding level of the destination store and that is associated with an advertiser identifier that is different than an advertiser identifier of the destination store as a predetermined recommended store from among other stores that belong to the same genre as the destination store and that do not belong to the same affiliated group as the destination store based on the crowding level of the destination store being greater than a predetermined threshold value;

generating a proposal advertisement for proposing to change the destination of the vehicle from the destination store to the predetermined recommended store;

dynamically determine an amount of incentive to include with the proposal advertisement, based on a current distance between the destination store and the predetermined recommended store; and transmitting, via a network and to a mobile terminal that moves with the vehicle, the proposal advertisement and the incentive to cause the mobile terminal to display the proposal advertisement and the incentive to the user who rides in the vehicle.

* * * * *